(12) United States Patent
Othman et al.

(10) Patent No.: US 10,986,551 B2
(45) Date of Patent: Apr. 20, 2021

(54) METHOD FOR MANAGING A LOW LATENCY HANDOVER FOR MOBILE HOST SEAMLESS MOBILITY

(71) Applicant: UNIVERSITI PUTRA MALAYSIA, Selangor (MY)

(72) Inventors: Mohamed Othman, Serdang (MY); Ibrahim Al-Surmi, Serdang (MY)

(73) Assignee: UNIVERSITI PUTRA MALAYSIA, Serdang (MY)

( * ) Notice: Subject to any disclaimer, the term of this patent is extended or adjusted under 35 U.S.C. 154(b) by 74 days.

(21) Appl. No.: 16/377,144

(22) Filed: Apr. 5, 2019

(65) Prior Publication Data
US 2019/0306772 A1  Oct. 3, 2019

Related U.S. Application Data

(63) Continuation-in-part of application No. 15/028,706, filed as application No. PCT/MY2014/000249 on Oct. 9, 2014, now abandoned.

(30) Foreign Application Priority Data

Oct. 11, 2013 (MY) .............................. PI2013701938

(51) Int. Cl.
*H04W 36/18* (2009.01)
*H04W 36/32* (2009.01)
*H04W 36/00* (2009.01)

(52) U.S. Cl.
CPC ....... *H04W 36/18* (2013.01); *H04W 36/0016* (2013.01); *H04W 36/0038* (2013.01); *H04W 36/00835* (2018.08); *H04W 36/32* (2013.01)

(58) Field of Classification Search
CPC .......... H04W 36/18; H04W 36/00835; H04W 36/0016; H04W 36/0038; H04W 36/32
See application file for complete search history.

(56) References Cited

U.S. PATENT DOCUMENTS

| | | | | |
|---|---|---|---|---|
| 2010/0135244 A1* | 6/2010 | Oulai | ............... | H04W 12/06 370/331 |
| 2010/0272062 A1* | 10/2010 | Velev | ............... | H04W 8/082 370/331 |

(Continued)

OTHER PUBLICATIONS

Ibrahim Al-Surmi et al., "Enhancing inter-PMIPv6-domain for superior handover performance across IP-based wireless domain networks", Wireless Networks, vol. 19 (6), Jan. 10, 2013, pp. 1317-1336.

(Continued)

*Primary Examiner* — Duc C Ho
(74) *Attorney, Agent, or Firm* — Steven M. War, Esq.

(57) ABSTRACT

The present invention relates to a method for managing a low latency of handover of MH comprising the steps of: determining imminence handover of the MH whether intra-domain or inter-domain using hybrid location tracking scheme, initiating an intra-domain handover mechanism if the handover is the intra-domain handover through transmitting the MH's context transfer towards multiple new MAG domain based on MCE list; initiating an inter-domain handover mechanism if the handover is the inter-domain handover through transmitting the MH's context transfer towards multiple fLMA domain based on the HLCE list; and redirecting all traffic towards the MH. The above provision is advantageous as it provides a hybrid latency low intra/inter-domain handover mechanism, which proactively coordinates MH's handover process as well as maintains MH's data session continually during its intra/inter-domain roaming within/across PMIPv6 domain respectively.

4 Claims, 4 Drawing Sheets

(56) References Cited

U.S. PATENT DOCUMENTS

2010/0315973 A1* 12/2010 Hirano .................. H04W 8/087
  370/254
2014/0098812 A1* 4/2014 Korhonen ............... H04W 8/26
  370/389

OTHER PUBLICATIONS

International Search Report and Written Opinion for International Application No. PCT/MY2014/000249 dated Mar. 5, 2015.

* cited by examiner

METHOD FOR MANAGING A LOW LATENCY HANDOVER FOR MOBILE HOST SEAMLESS MOBILITY

FIELD OF INVENTION

The present invention relates to a method for managing a seamless handover of a MH in wireless network framework.

BACKGROUND OF THE INVENTION

Recently, IETF proposed another protocol like Proxy Mobile IPv6 (PMIPv6) as a network-based mobility management approach to overcome the most Internet Protocol (IP) mobility challenge and support the Mobile Host (MH) mobility roaming within a localized domain network (i.e., intra-domain mobility/horizontal handover). In addition, PMIPv6 assign network entities to carry out the mobility-related signaling on behalf of the MH and shortens these signaling by form of the localized domain during MH intra-domain handover. Therefore, it allows diverse type of MHs to utilize the PMIPv6 services with less IP-stack complexity and power uses as well as saving the air resource (i.e., lessens the mobility signaling over the wireless link). Nevertheless, although PMIPv6 mobility management performs superior than the MIPv6 and its extensions it cannot support MH inter-domain mobility, since its primary designed for MH intra-domain mobility. Thus, when MH moves out across PMIPv6 domain edge will incur a connection disruption, which disables the continuity of its communication session.

In addition, in future high-speed mobility environment (i.e., train, vehicle, etc.) providing anywhere and anytime Internet accesses for real-time sensitive service becomes an important issue. This can be achieved using IP mobility management protocol like PMIPv6. Accordingly, in order to support IP mobility with service continuity for high-speed environments. PMIPv6 have to provide a seamless handover scheme and utilize the geographical position information of the base stations access links. Since, the typical high-speed mobility host moves with considerable distance at very high-speed movements, which usually restricted to directional/bidirectional movement along the pathways.

Concerns have been raised by several relevant conventional inter-PMIPv6-domain schemes about supporting MH inter-domain mobility. However these schemes lack to support an efficient seamless handover for MH mobility roaming both in intra/inter-domain. Due to their considerable handover latency, data traffic losses, extra mobility-related signaling and high end-to-end traffic latency. Hence, these issues negatively impede the performance requirements to satisfy the Quality of Service (QoS) for the real-time sensitive services towards providing uninterrupted network connectivity.

SUMMARY OF THE INVENTION

According to an aspect of the present invention, the present invention provides a method for managing a low latency of handover of MH comprising the steps of: determining imminence handover of the MH whether intra-domain or inter-domain using hybrid location tracking scheme (100); initiating an intra-domain handover mechanism (200) if the handover is the intra-domain handover through transmitting the MH's context transfer towards multiple new Mobile Access Gateway (MAG) domain based on MCE cache list; initiating an inter-domain handover mechanism (300) if the handover is the inter-domain handover through transmitting the MH's context transfer towards multiple foreign Local Mobility Anchor (fLMA) domain based on the HLCE cache list; and redirecting all traffic towards the MH (400).

The above provision is advantageous as it provides a hybrid latency low intra/inter-domain handover mechanism, which proactively coordinates MH's handover process as well as maintains MH's data session continually during its intra/inter-domain roaming within/across PMIPv6 domain respectively.

The present invention introduces an intermediate hybrid mobility anchor entity, called intermediate Hybrid Local Mobility Anchor (iHLMA), which is responsible to manage and coordinate MH inter-domain mobility as well as redirect MH's data traffic towards PMIPv6 domains.

Furthermore, the present invention provides a proactive intra/inter location registration along with access authentication tightly together in advance the MH roaming towards target intra/inter-domain access links as soon it is notified about the MH imminent handover either within or across an intra/inter-domain boundary, respectively. This process can be identified by means of the hybrid location tracking mechanism. Thus, as soon the MH attaches to any pre-informed neighbour location, it can re-configure its interface more quickly and resume its data session.

DETAILED DESCRIPTION OF THE PREFERRED EMBODIMENT

Figure 1:
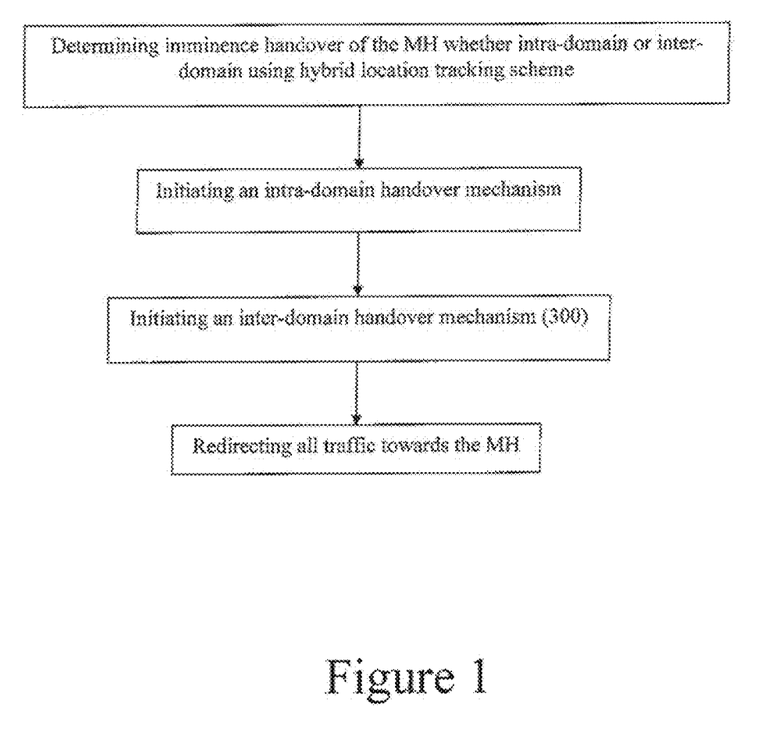
FIG. 1 illustrates a flowchart of the method for managing a low latency handover for MH seamless mobility of the present invention.

Generally, the present invention relates to a method for managing a low latency of handover of MH comprising the steps of: determining imminence handover of the MH whether intra-domain or inter-domain using hybrid location tracking scheme (100); initiating an intra-domain handover mechanism (200) if the handover is the intra-domain handover through transmitting the MH's context transfer towards multiple new MAG domain based on MCE cache list; initiating an inter-domain handover mechanism (300) if the handover is the inter-domain handover through transmitting the MH's context transfer towards multiple fLMA domain based on the HLCE cache list; and redirecting all traffic towards the MH (400). The general step of the handover process of the present invention is illustrated in FIG. 1.

Figure 2:
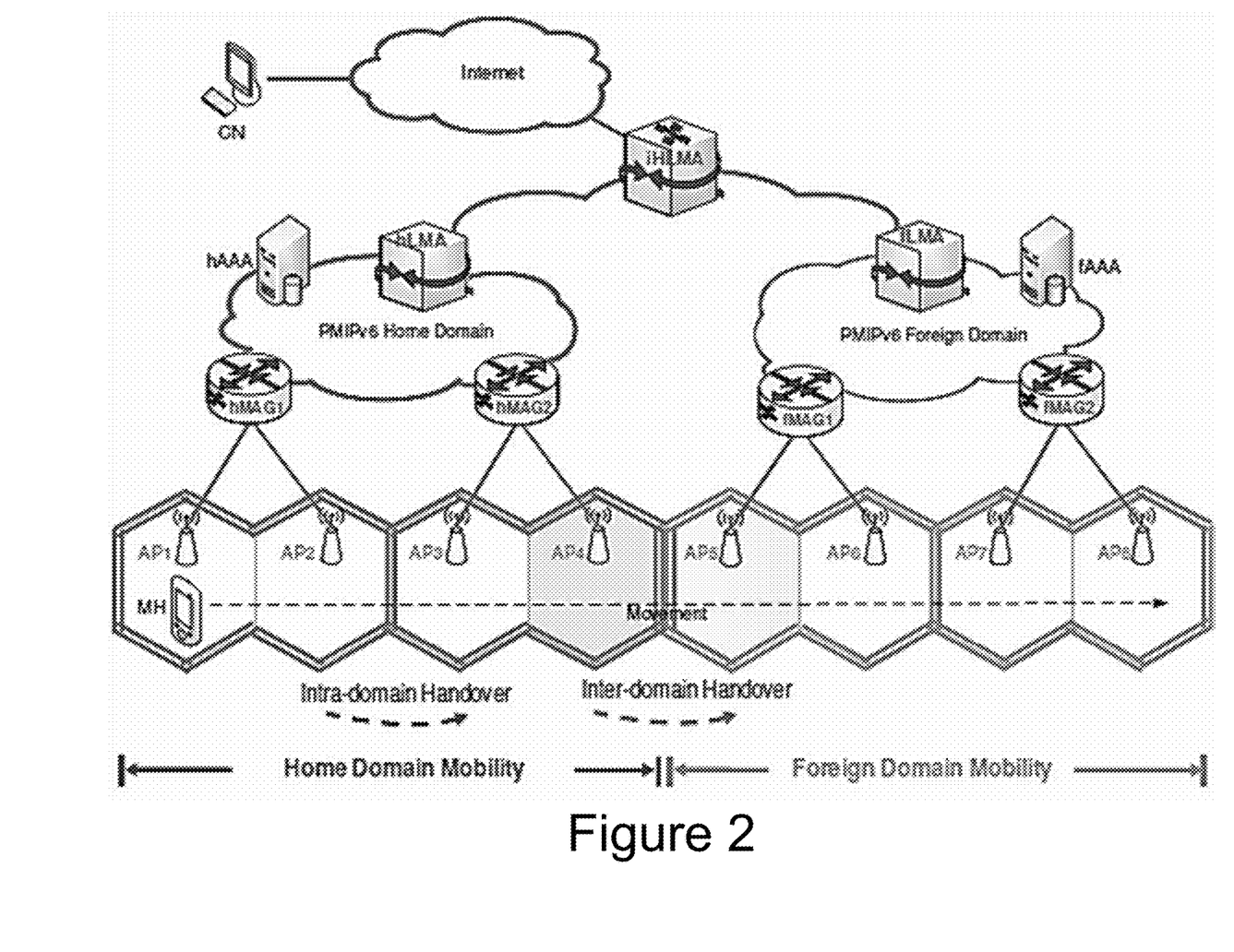
FIG. 2 illustrates a network structure of location tracking of the handover of the MH of the present invention.

To understand figuratively the network structure of location tracking of the handover of the MH of the present invention, it is illustrated in FIG. 2.

The steps of initiating an intra-domain handover mechanism (200) further comprising: sending a De-Reg PBU message from home Mobile Access Gateway (hMAG) access link to home Local Mobility Anchor (hLMA) (201); activating proactive intra-domain pre-registration and access authentication in advance of MH actual detachment by sending a PBAck message from the hLMA comprising the MH's profile with authentication information along with setting up one-way tunnel towards new hMAGs neighbours based on the MCE list (202); bypass the access authentication by the new hMAG whenever it detects the MH attachments by comparing the MH-ID and MH-HNP with the pre-registered MH's profile (203); updating MH's BUL entry and sending a quick RtrAdv message with same MH-HNP by the new hMAG towards the MH to re-configure its interface to quickly resume its data session if matched (204); sending the PBU message by the new hMAG to the hLMA indicating to complete MH's location update (205); and setting up a reverse endpoint tunnel by the new hMAG towards the hLMA offering MH's traffic access (206).

The steps of initiating an inter-domain handover mechanism (300) further comprising: sending a De-Reg PBU message from the hMAG to the hLMA whenever the hMAG senses the MH imminent inter-domain handover towards the foreign Mobile Access Gateway (fMAG)'s access link (301); sending Hybrid_PBU message from the hLMA to the iHLMA alerting iHLMA about MH inter-domain movement (302); activating the proactive inter-domain registration and authentication by the iHLMA in advance earlier of MH roaming away from hLMA domain by transmitting the Hybrid_PBAck message comprising MH's profile and authentication information along with sets up one-way tunnel towards the foreign Local Mobile Access (fLMA) domains based on the HLCE list (303); sending a PBAck message comprising the MH's context profile by all the fLMAs neighbours that received the MH's context profile and setting up a one-way tunnel towards their access link (304); bypassing the access authentication process by comparing the MH-1D and the MH-HNP with the pre-registered MH's profile by the tMAG whenever it detects MH attachment (305); updating its record and authorising its access by sending a quick RtrAdv message with the same MH-HNP offered at the home domain by the tMAG if the MH matched with the pre-registered MH (306); completing its domain registration by the tMAG by sending a PBU message in response to the proactive PBAck message and setting up a reverse end-point tunnel towards its fLMA (307); sending the Hybrid_PBU message by the fLMA to the iHLMA in response to the Hybrid_PBAck message (308); and setting up a reverse end-point tunnel by the fLMA towards the iHLMA, which indicates the completion of the pre-registered MH's inter-domain location update and offers MH's traffic access (309).

The steps of redirecting all traffic towards the MH (400) further comprising: updating MH's BCE record by the hLMA and redirecting the MH traffic through the new hMAG for intra-domain handover (401); and updating the MH's record in the iHLMA's BCE by the iHLMA and redirecting all traffic towards the MH through the fLMA's access link for inter-domain handover (402).

Figure 3:
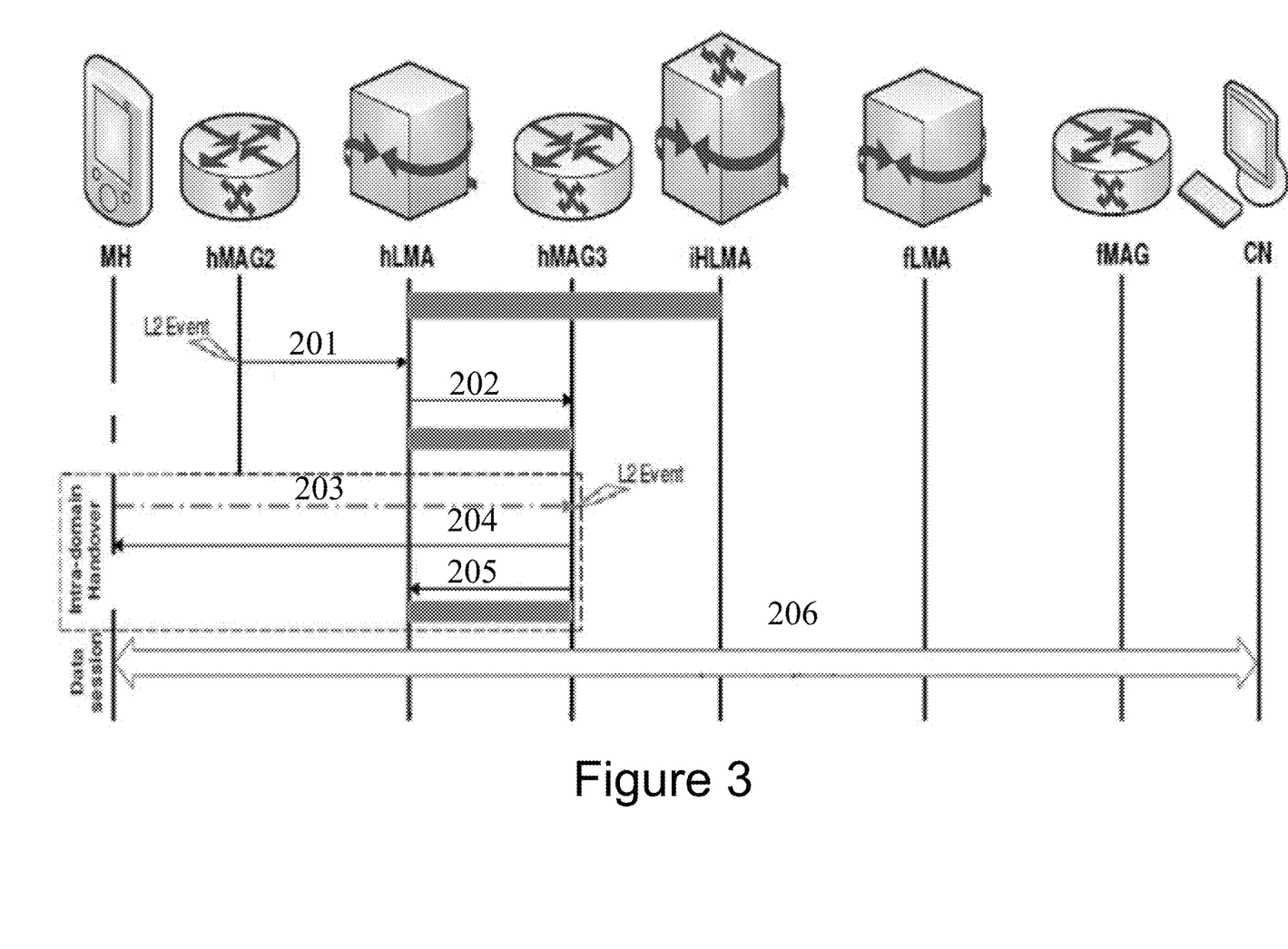
FIG. 3 illustrates message flows of an intra-domain handover of the present invention.

For further explanation of the present invention in the case of intra-domain handover, it is illustrated in FIG. 3 in which:

The hMAG access link sends a De-Reg PBU message to the hLMA (with zero lifetime & flag Z set to "0"). The hLMA activates the proactive intra-domain pre-registration and access authentication in advance of MH actual detachment. This is done by sending a PBAck message (with flag Z set to "1") comprising the MH's profile with authentication information along with sets up one-way tunnel towards the new hMAGs neighbours based on the MCE list. The new hMAGs neighbours (e.g. hMAG3), which receives the MH's context information profile, it must keep the MH's information certain period of time. Then, whenever it detects the MH attachments, it will bypass the access authentication by comparing the MH-ID and MH-HNP with the pre-registered MH's profile. If successfully matched, the hMAG3 updates MH's BUL entry and sends a quick RtrAdv message with same MH-HNP towards the MH to re-configure its interface to quickly resume its data session. After that, the hMAG3 sends the PBU message to the hLMA (with flag Z set to "1" and a new lifetime) indicates to complete MH's location update. Subsequently, the hMAG3 sets up a reverse endpoint tunnel towards the hLMA offering MH's traffic access. Finally, the hLMA updates MH's BCE record and redirects the MH traffic through the hMAG3.

Figure 4:
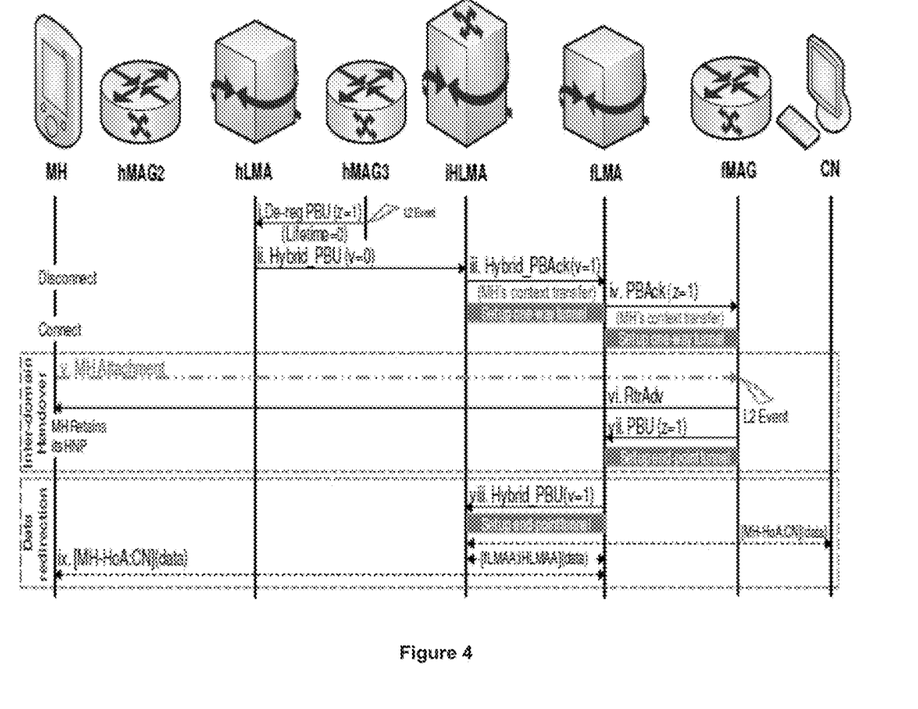
FIG. 4 illustrates message flows of an inter-domain handover of the present invention.

Referring to FIG. 4, in the case of inter-domain handover:

Whenever the hMAG3 senses the MH imminent inter-domain handover towards the fMAG's access link, it sends a De-Reg PBU message to the hLMA (with zero lifetime & flag Z set to "1"). The hLMA sends Hybrid_PBU message to the iHLMA (with zero lifetime & flag V set to "0") alerting iHLMA about MH inter-domain movement. The iHLMA activates the proactive inter-domain registration and authentication in advance earlier of MH roaming away from hLMA domain. This is done by transmitting the Hybrid_PBAck message (with flag V set to "1") comprising MH's profile and authentication information along with sets up one-way tunnel towards the fLMA domains based on the HLCE list. Then, all fLMAs neighbours that received the MH's context profile must keep the MH's information certain period of time. Subsequently, they send a PBAck message comprising the MH's context profile and set up a one-way tunnel towards their access link. Whenever the fMAG detects MH attachment, it will bypass the access authentication process by comparing the MH-1D and the MH-HNP with the pre-registered MH's profile. If this MH matched with the pre-registered MH, the fMAG updates its record and authorises its access by sending a quick RtrAdv message with the same MH-HNP offered at the home domain. Then, the fMAG completes its domain registration by sending a PBU message in response to the proactive PBAck message and sets up a reverse end-point tunnel towards its fLMA. Next, the fLMA sends the Hybrid_PBU message to the iHLMA (with flag V set to "1" and a new lifetime) in response to the Hybrid_PBAck message. Then, it sets up a reverse end-point tunnel towards the iHLMA, which indicates the completion of the pre-registered MH's inter-domain location update and offers MH's traffic access. Lastly, the iHLMA updates the MH's record in the iHLMA's BCE and henceforth, redirects all traffic towards the MH through the fLMA's access link.

Although the invention has been described with reference to particular embodiment, it is to be understood that the embodiment is merely illustrative of the principles and applications of the present invention. It is therefore to be understood that numerous modifications may be made to the illustrative embodiment that other arrangements may be devised without departing from the scope of the present invention as defined by the appended claims.

Glossary & Abbreviations

MH Mobile Host

Description: Mobile Host (MH) is a mobility entity proposed by the INVENTION as described in the invention document as mobile host and it correspond to the Mobile Node (MN) according to RFC5213 as mentioned in section (2.2. Terminology, page 6) as follows: the term mobile node is used to refer to an IP host or router whose mobility is managed by the network. The mobile node may be an IPv4-only node, IPv6-only node, or a dual-stack node and is not required to participate in any IP mobility related signaling for achieving mobility for an IP address that is obtained in that Proxy Mobile IPv6 domain.

De-Reg PBU De-Registration Proxy Binding Update

Description: (De-Reg PBU) signaling message is according to RFC5213 as mentioned in section (5.3.5. Binding De-Registration, page 24). Moreover, the "De-Reg PBU" in INVENTION means a De-Registration Proxy Binding Update (De-Reg PBU) signaling message used to de-registration the Mobile Host from hMAG entity to the hLMA entity as mentioned in signaling call messages in the INVENTION document.

PBU Proxy Binding Update

Description: The Proxy Binding Update (PBU) signaling message is according to RFC5213 as mentioned in section (2.2. Terminology, page 8). Moreover, the "PBU" in INVENTION means Proxy Binding Update (PBU) signaling message, is a request message sent by a Mobile Access Gateway to a Mobile Host's Local Mobility Anchor for establishing a binding between the Mobile Host's home network prefix assigned to a given interface of a Mobile Host and its current address, as described in the INVENTION document.

PBAck Proxy Binding update Acknowledgement

Description: Proxy Binding update Acknowledgement (PBAck) signaling message is according to RFC5213 as mentioned in section (5.3.6. Constructing the Proxy Binding Acknowledgement Message, page 25). Moreover, the "PBAck" in INVENTION means a Proxy Binding Update Acknowledgement (PBAck) signaling message used as a reply message sent by a Local Mobility Anchor in response to a Proxy Binding Update (PBU) message that it received from a Mobile Access Gateway as mentioned in signaling call messages in the INVENTION document.

MH-ID Mobile Host-Identification

Description: The Mobile Host-Identification (MH-ID) is according to RFC5213 as mentioned in section (2.2. Terminology, page 7) as well as section (6.6. Acquiring Mobile Node's Identifier, page 45). Moreover, the "MH-ID" in INVENTION means Mobile Host-Identification (MH-ID) to provide an identity of a Mobile Host in the Proxy Mobile IPv6 domain. This is the stable identifier of a Mobile Host that the mobility entities in a Proxy Mobile IPv6 domain can always acquire and use for predictably identifying a Mobile Host, as described in the INVENTION document.

BUL Binding Update List

Description: The Binding Update List (BUL) is according to RFC5213 as mentioned in section (6.1. Extensions to Binding Update List Entry Data Structure, page 42). Moreover, the "BUL" in INVENTION means Binding Update List (BUL) is a conceptual data structure, that every Mobile Access Gateway must maintain a Binding Update List. Each entry in the Binding Update List represents a mobile host's mobility binding with its Local Mobility Anchor, as described in the INVENTION document.

RtrAdv Router Advertisement

Description: The Router Advertisement (RtrAdv) signaling message is according to RFC5213 as mentioned in section (6.4. Supported Address Configuration Modes, page 44) as well as section (6.9.2. Router Solicitation Messages, page 56). Moreover, the "RtrAdv" in INVENTION means Router Advertisement (RtrAdv) message. The Mobile Access Gateway send Router Advertisement (RtrAdv) messages to the Mobile Host on the access link advertising the mobile Host's home network prefix as the hosted on-link prefix, as described in the INVENTION document.

Hybrid_PBU Hybrid Proxy Binding Update

Description: The "Hybrid_PBU message" in INVENTION means Hybrid Proxy Binding Update (Hybrid_PBU) signaling message which sent by either hLMA to iHLMA alerting about MH inter-domain movement or sent by fLMA to iHLMA in response to Hybrid_PBAck message, as mentioned in signaling call messages in FIG. 4 and it correspond to the Proxy Binding Update (PBU) is according to RFC5213 as mentioned in section (2.2. Terminology, page 8) with additional procedures, as described in the INVENTION document.

Hybrid_PBAck Hybrid Proxy Binding update Acknowledgement

Description: The "Hybrid_PBAck message" in INVENTION means Hybrid Proxy Binding update Acknowledgement (Hybrid_PBAck) signaling message sent by an intermediate Hybrid Local Mobility Anchor (iHLMA) to transfer MH's context information to the fLMA to as mentioned in signaling call messages in FIG. 4 and it correspond to Proxy Binding update Acknowledgement (PBAck) according to RFC5213 as mentioned in section (5.3.6. Constructing the Proxy Binding Acknowledgement Message, page 25) with additional procedures, as described in the INVENTION document.

MCE MAGs Cache Entry

Description: The MAGs_Cache_Entry (MCE) is a cache list proposed by the INVENTION, as described in the INVENTION document as follows:

In order to support MH's seamless intra-domain handover mobility, the LMA maintains a new data structure cache list called MAGs_Cach_Entry (MCE). This MCE list contains the necessary information required to maintain the registrations status for a group of MAGs. Thus, whenever any MAG mobility entity associates or dissociates with PMIPv6 administration domain, their status will be updated. Moreover, the MH's context information profile is multicasted to multiple MAGs based on MCE list and this context transfer intended for pre-registration and pre-authentication processes tightly together in advance earlier of MH detachment from the current MAG access link. Therefore, it allows the MH to re-configure its interface by receiving quick RtrAdv messages as soon as it attaches to the new MAG, and resume its communication session more quickly.

HLCE Hybrid LMAs Cache Entry

Description: The Hybrid_LMAs_Cache_Entry (HLCE) is a cache list proposed by the INVENTION, as described in the INVENTION document as follows:

In order to support MH's inter-domain seamless handover mobility, the iHLMA maintains a new data structure cache list called Hybrid_LMAs_Cache_Entry (HLCE). This HLCE list contains the necessary information required to maintain the registration status for a group of LMAs. Thus, whenever any LMA mobility entity associates or dissociates with PMIPv6 administration domain, their status will be updated.

Moreover, this HLCE list is used in iHLMA to proactively transmit the MH's context profile and authentication information (e.g. MH-ID, MH-HNP) towards nLMAs neighbours domains which are registered previously on the HLCE list. Accordingly, these neighbours domains store this context information for a certain period of time. Afterwards, whenever the pre-registered MH attaches to any one of these neighbour domain's access links, the MH is able to re-configure its interface faster and resume its data session.

iHLMA Intermediate Hybrid Mobility Anchor Entity

Description: iHLMA is an mobility entity proposed by the INVENTION as described in the invention document and it correspond to the Local Mobility Anchor (LMA) mobility entity according to RFC5213 as mentioned in section (2.2. Terminology, page 5) with additional functions, as described in the INVENTION document as follows: the iHLMA connects several neighbours PMIPv6 domains together in order to support MH mobility. Furthermore, the LMA and iHLMA entities are responsible to manage the MH intra and inter-domain handover. This is done by performing a pro-active intra/inter-domain location registration and access authentication in advance earlier of the MH imminent roaming within/across PMIPv6-domains, respectively.

The iHLMA coordinates MH inter-domain mobility whenever it is alerted regarding the imminent MH inter-domain handover. The iHLMA proactively transmits the MH's context profile and authentication information (e.g. MH-ID, MH-HNP) towards fLMAs neighbours domains based on the novel list called Hybrid LMAs Cache Entry (HLCE). Accordingly, these neighbours domains store this context information for a certain period of time. Afterwards, whenever the pre-registered MH attaches to any one of these neighbour domain's access links, the MH is able to re-configure its interface faster and resume its data session.

LMA Local Mobility Anchor

Description: LMA is according to RFC5213 as mentioned in section (2.2. Terminology, page 5) as follows: Local Mobility Anchor is the home agent for the mobile node in a Proxy Mobile IPv6 domain. It is the topological anchor point for the mobile node's home network prefix(es) and is the entity that manages the mobile node's binding state. The local mobility anchor has the functional capabilities of a home agent as defined in Mobile IPv6 base specification [RFC3775] with the additional capabilities required for supporting Proxy Mobile IPv6 protocol as defined in this specification.

hLMA home Local Mobility Anchor

Description: home Local Mobility Anchor (hLMA) is mobility entity proposed by the INVENTION as described in the invention document as old LMA and it correspond to the Local Mobility Anchor (LMA) mobility entity according to RFC5213 as mentioned in section (2.2. Terminology, page 5) as follows: Local Mobility Anchor is the home agent for the mobile node in a Proxy Mobile IPv6 domain. It is the topological anchor point for the mobile node's home network prefix(es) and is the entity that manages the mobile node's binding state. The local mobility anchor has the functional capabilities of a home agent as defined in Mobile IPv6 base specification [RFC3775] with the additional capabilities required for supporting Proxy Mobile IPv6 protocol as defined in this specification. Moreover, it has with additional functions, as described in the INVENTION document as follows: the hLMA at the home domain responsible for receiving all traffic destined to the MH. Then, it forwards this traffic towards the fLMA at the new domain.

fLMA foreign Local Mobility Anchor

Description: foreign Local Mobility Anchor (fLMA) is mobility entity proposed by the INVENTION as described in the invention document as new LMA and it correspond to the Local Mobility Anchor (LMA) mobility entity according to RFC5213 as mentioned in section (2.2. Terminology, page 5) as follows: Local Mobility Anchor is the home agent for the mobile node in a Proxy Mobile IPv6 domain. It is the topological anchor point for the mobile node's home network prefix(es) and is the entity that manages the mobile node's binding state. The local mobility anchor has the functional capabilities of a home agent as defined in Mobile IPv6 base specification [RFC3775] with the additional capabilities required for supporting Proxy Mobile IPv6 protocol as defined in this specification. Moreover, it has additional functions, as described in the INVENTION document: the fLMA at the new/foreign domain responsible for receiving all traffic destined to the MH. Moreover, it stores MH's context information during inter-domain handover for a certain period of time. Afterwards, whenever the pre-registered MH attaches to any one of these fLMAs neighbour domain's access links, the MH is able to re-configure its interface faster and resume its data session.

MAG Mobile Access Gateway

Description: Mobile Access Gateway (MAG) is according to RFC5213 as mentioned in section (2.2. Terminology, page 5) as follows: Mobile Access Gateway is a function on an access router that manages the mobility-related signaling for a mobile node that is attached to its access link. It is responsible for tracking the mobile node's movements to and from the access link and for signaling the mobile node's local mobility anchor.

hMAG home Mobile Access Gateway

Description: home Mobile Access Gateway (hMAG) is mobility entity proposed by the INVENTION as described in the invention document as old MAG and it correspond to the Mobile Access Gateway (MAG) according to RFC5213 as mentioned in section (2.2. Terminology, page 5) as follows: Mobile Access Gateway is a function on an access router that manages the mobility-related signaling for a mobile node that is attached to its access link. It is responsible for tracking the mobile node's movements to and from the access link and for signaling the mobile node's local mobility anchor.

Moreover, it has additional functions, as described in the INVENTION document as follows: the hMAG at the home domain responsible for sensing the MH imminent inter-domain handover towards the fMAG's access link, and it informs the hLMA in order to comprising the MH's profile with authentication information along with sets up one-way tunnel towards the new hMAGs neighbours based on the MCE list. Moreover, the new hMAGs neighbours whenever it detects the MH attachments, it will bypass the access authentication and resume MH's data session.

fMAG foreign Mobile Access Gateway

Description: foreign Mobile Access Gateway (fMAG) is mobility entity proposed by the INVENTION as described in the invention document as new MAG and it correspond to the Mobile Access Gateway (MAG) according to RFC5213 as mentioned in section (2.2. Terminology, page 5) as follows: Mobile Access Gateway is a function on an access router that manages the mobility-related signaling for a mobile node that is attached to its access link. It is responsible for tracking the mobile node's movements to and from the access link and for signaling the mobile node's local mobility anchor.

Moreover, it has with additional functions, as described in the INVENTION document as follows: the fMAG is the same as hMAG functions expect it is location at the foreign domain. Moreover, in the case of the MH intra-domain mobility, the hMAG updates the hLMA about the MH point-of-attachment. Otherwise, the fMAG will update the iHLMA entity about the MH new location in the case of MH inter-domain mobility. Hence, this tracking technique supports the MH hybrid intra and inter-domain handovers predictions in order to maintain MH seamless mobility and grant the continuity of MH communication.

PMIPv6-Domain Proxy Mobile IPv6 Domain

Description: Proxy Mobile IPv6 Domain (PMIPv6-Domain) is according to RFC5213 as mentioned in section (2.2. Terminology, page 5) as follows: Proxy Mobile IPv6 domain refers to the network where the mobility management of a mobile node is handled using the Proxy Mobile IPv6 protocol as defined in this specification. The Proxy Mobile IPv6 domain includes local mobility anchors and mobile access gateways between which security associations can be set up and authorization for sending Proxy Binding Updates on behalf of the mobile nodes can be ensured.

LMAA LMA Address

Description: LMA Address (LMAA) is according to RFC5213 as mentioned in section (2.2. Terminology, page 6) as follows: The global address that is configured on the interface of the local mobility anchor and is the transport endpoint of the bidirectional tunnel established between the local mobility anchor and the mobile access gateway. This is the address to which the mobile access gateway sends the Proxy Binding Update messages. When supporting IPv4 traversal, i.e., when the network between the local mobility anchor and the mobile access gateway is an IPv4 network, this address will be an IPv4 address and will be referred to as IPv4-LMAA, as specified in [IPV4-PMIP6].

Proxy-CoA Proxy Care-of Address

Description: Proxy Care-of Address (Proxy-CoA) is according to RFC5213 as mentioned in section (2.2. Terminology, page 6) as follows: Proxy-CoA is the global address configured on the egress interface of the mobile access gateway and is the transport endpoint of the tunnel between the local mobility anchor and the mobile access gateway. The local mobility anchor views this address as the care-of address of the mobile node and registers it in the Binding Cache entry for that mobile node. When the transport network between the mobile access gateway and the local mobility anchor is an IPv4 network and if the care-of address that is registered at the local mobility anchor is an IPv4 address, the term, IPv4 Proxy-CoA is used, as specified in [IPV4-PMIP6].

MN-HoA Mobile Node's Home Address

Description: Mobile Node's Home Address (MN-HoA) is according to RFC5213 as mentioned in section (2.2. Terminology, page 7) as follows: MN-HoA is an address from a mobile node's home network prefix. The mobile node will be able to use this address as long as it is attached to the access network that is in the scope of that Proxy Mobile IPv6 domain. If the mobile node uses more than one address from its home network prefix(es), any one of these addresses is referred to as mobile node's home address. Unlike in Mobile IPv6 where the home agent is aware of the home address of the mobile node, in Proxy Mobile IPv6, the mobility entities are only aware of the mobile node's home network prefix (es) and are not always aware of the exact address(es) that the mobile node configured on its interface from its home network prefix(es). However, in some configurations and based on the enabled address configuration modes on the access link, the mobility entities in the network can be certain about the exact address(es) configured by the mobile node.

AAA Authentication, Authorization, and Accounting

Description: The Authentication, Authorization, and Accounting (AAA) or a policy store is according to RFC5213 as mentioned in section (4. Proxy Mobile IPv6 Protocol Security, in page 16 and in Appendix A. Proxy Mobile IPv6 Interactions with AAA Infrastructure, page 89) as follows: Appendix A. Proxy Mobile IPv6 Interactions with AAA Infrastructure.

Every mobile node that roams in a proxy Mobile IPv6 domain would typically be identified by an identifier, MN-Identifier, and that identifier will have an associated policy profile that identifies the mobile node's home network prefix(es) on a per-interface basis, permitted address configuration modes, roaming policy, and other parameters that are essential for providing network-based mobility management service. This information is typically configured in AAA. In some cases, the home network prefix(es) may be dynamically assigned to the mobile node's interface, after its initial attachment to the Proxy Mobile IPv6 domain over that interface and may not be configured in the mobile node's policy profile.

The network entities in the proxy Mobile IPv6 domain, while serving a mobile node, will have access to the mobile node's policy profile and these entities can query this information using RADIUS [RFC2865] or DIAMETER [RFC3588] protocols.

BCE Binding Cache Entry

Description: corresponds to Binding Cache Entry (BCE) in which every local mobility anchor MUST maintain a Binding Cache entry for each currently registered mobile node, (as described in Section 5.1 of [RFC5213], page 18). Moreover, A Binding Cache entry is a conceptual data structure, (as described in Section 9.1 of [RFC3775] page 74) as follows:

IPv6 nodes with route optimization support maintain a Binding Cache of bindings for other nodes. A separate Binding Cache SHOULD be maintained by each IPv6 node for each of its unicast routable addresses. The Binding Cache MAY be implemented in any manner consistent with the external behavior described in this document, for example by being combined with the node's Destination Cache as maintained by Neighbor Discovery. When sending a packet, the Binding Cache is searched before the Neighbor Discovery conceptual Destination Cache.

MH-HNP Mobile Node's Home Network Prefix

Description: corresponds to the Mobile Node's Home Network Prefix (MN-HNP) according to ([RFC5213] as mentioned in Section 2.2. Terminology, page 6) as well as (in Section 5.2. Supported Home Network Prefix Models, page 19) as follows:

The MN-HNP is a prefix assigned to the link between the mobile node and the mobile access gateway. More than one prefix can be assigned to the link between the mobile node and the mobile access gateway, in which case, all of the assigned prefixes are managed as a set associated with a mobility session. The mobile node configures its interface with one or more addresses from its home network prefix (es). If the mobile node connects to the Proxy Mobile IPv6 domain through multiple interfaces, simultaneously, each of the attached interfaces will be assigned a unique set of home network prefixes, and all the prefixes assigned to a given interface of a mobile node will be managed under one mobility session.

Note: most of the general mobility-related acronyms mentioned herein are to be interpreted as defined in the Proxy Mobile IPv6 base specification [RFC5213] with additional functions and procedures as mentioned.

The invention claimed is:

1. A method for managing a low latency of handover of Mobile Host (MH) comprising the steps of:
   determining imminence handover of the MH whether intra-domain or inter-domain using hybrid location tracking scheme;
   initiating an intra-domain handover mechanism when the handover is the intra-domain handover through transmitting the MH's context transfer towards multiple new Mobile Access Gateway (MAG) domain based on a MAGs Cache Entry (MCE) list;

initiating an inter-domain handover mechanism when the handover is the inter-domain handover through transmitting the MH's context transfer towards multiple foreign Local Mobility Anchor (fLMA) domain based on a Hybrid LMAs Cache Entry (HLCE) list; and redirecting all traffic towards the MH.

2. A method for managing a low latency of handover of MH as claimed in claim 1,
wherein the step of initiating an intra-domain handover mechanism further comprising:
sending a De-Registration Proxy Binding Update (De-Reg PBU) message from home Mobile Access Gateway (hMAG) access link to home Local Mobility Anchor (hLMA);
activating proactive intra-domain pre-registration and access authentication in advance of MH actual detachment by sending a Proxy Binding update Acknowledgement (PBAck) message from the hLMA comprising the MH's profile with authentication information along with setting up one-way tunnel towards new hMAGs neighbours based on the MCE list;
bypass the access authentication by the new hMAG whenever it detects the MH attachments by comparing a Mobile Host-Identification (MH-ID) and a Mobile Host-Home Network Prefix (MH-HNP) with the pre-registered MH's profile;
updating MH's Binding Update List (BUL) entry and sending a quick Router Advertisement (RtrAdv) message with same MH-HNP by the new hMAG towards the MH to re-configure its interface to quickly resume its data session if matched;
sending a Proxy Binding Update (PBU) message by the new hMAG to the hLMA indicating to complete MH's location update; and
setting up a reverse endpoint tunnel by the new hMAG towards the hLMA offering MH's traffic access.

3. A method for managing a low latency of handover of MH as claimed in claim 1, wherein the step of initiating an inter-domain handover mechanism further comprising:
sending a De-Reg PBU message from the hMAG to the hLMA whenever the hMAG senses the MH imminent inter-domain handover towards the foreign Mobile Access Gateway (fMAG's) access link; sending a Hybrid Proxy Binding Update (Hybrid_PBU) message from the hLMA to the intermediate Hybrid Local Mobility Anchor (iHLMA) alerting iHLMA about MH inter-domain movement;
activating the proactive inter-domain registration and authentication by the iHLMA in advance earlier of MH roaming away from hLMA domain by transmitting a Hybrid Proxy Binding update Acknowledgement (Hybrid_PBAck) message comprising MH's profile and authentication information along with sets up one-way tunnel towards the fLMA domains based on the HLCE list; sending a PBAck message comprising the MH's context profile by all the fLMAs neighbours that received the MH's context profile and setting up a one-way tunnel towards their access link;
bypassing the access authentication process by comparing the MH-ID and the MH-HNP with the pre-registered MH's profile by the fMAG whenever it detects MH attachment;
updating its record and authorising its access by sending a quick RtrAdv message with the same MH-HNP offered at the home domain by the fMAG if the MH matched with the pre-registered MH;
completing its domain registration by the fMAG by sending a PBU message in response to the proactive PBAck message and setting up a reverse end-point tunnel towards its fLMA;
sending the Hybrid_PBU message by the fLMA to the iHLMA in response to the Hybrid_PBAck message; and
setting up a reverse end-point tunnel by the fLMA towards the iHLMA, which indicates the completion of the pre-registered MH's interdomain location update and offers MH's traffic access.

4. A method for managing a low latency of handover of MH as claimed in claim 1, wherein the step of redirecting all traffic towards the MH further comprising: updating MH's Binding Cache Entry (BCE) record by the hLMA and redirecting the MH traffic through the new hMAG for intra-domain handover; and
updating the MH's record in the iHLMA's BCE by the iHLMA and redirecting all traffic towards the MH through the fLMA's access link for inter-domain handover.

* * * * *